United States Patent
Mergenthaler et al.

(10) Patent No.: US 6,427,130 B1
(45) Date of Patent: Jul. 30, 2002

(54) METHOD AND DEVICE FOR REGULATING A QUANTITY OF MOTION REPRESENTING THE MOVEMENT OF A VEHICLE

(75) Inventors: Rolf-Hermann Mergenthaler, Leonberg; Werner Urban, Vaihingen/Enz, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/254,156

(22) PCT Filed: May 9, 1998

(86) PCT No.: PCT/DE98/01299
§ 371 (c)(1),
(2), (4) Date: Apr. 26, 1999

(87) PCT Pub. No.: WO99/01321
PCT Pub. Date: Jan. 14, 1999

(30) Foreign Application Priority Data

Jul. 2, 1997 (DE) .......................................... 197 28 095

(51) Int. Cl.$^7$ ................................................. B62D 6/00
(52) U.S. Cl. ....................................... 702/142; 702/127
(58) Field of Search ................................ 702/142, 127; 701/1, 36, 41, 70–72, 78, 82, 83, 91; 303/140, 146, 147, 186; 73/121, 146

(56) References Cited

U.S. PATENT DOCUMENTS

| | | | | |
|---|---|---|---|---|
| 4,679,808 A | * | 7/1987 | Ito et al. ........................ | 280/91 |
| 5,072,803 A | * | 12/1991 | Kilian et al. ................. | 180/141 |
| 5,446,658 A | * | 8/1995 | Pastor et al. ............ | 364/424.01 |
| 5,559,700 A | * | 9/1996 | Majeed et al. .......... | 364/424.15 |
| 5,842,143 A | * | 11/1998 | Lohrenz et al. ................ | 701/34 |
| 5,864,769 A | * | 1/1999 | Inagaki et al. ................. | 701/70 |
| 5,890,084 A | * | 3/1999 | Halasz et al. .................. | 701/45 |
| 5,895,433 A | * | 4/1999 | Chen et al. .................... | 701/41 |
| 5,899,952 A | * | 5/1999 | Fukada ......................... | 701/74 |
| 6,035,251 A | * | 3/2000 | Hace et al. .................... | 701/70 |
| 6,056,371 A | * | 5/2000 | Lin et al. ..................... | 303/146 |
| 6,073,065 A | * | 6/2000 | Brown et al. .................. | 701/36 |
| 6,076,033 A | * | 6/2000 | Hamada et al. ................ | 701/82 |
| 6,079,800 A | * | 6/2000 | Lin et al. ..................... | 303/146 |
| 6,112,147 A | * | 8/2000 | Ghoneim et al. .............. | 701/80 |
| 6,122,584 A | * | 9/2000 | Lin et al. ....................... | 701/70 |
| 6,125,319 A | * | 9/2000 | Hac et al. ...................... | 701/80 |
| 6,175,781 B1 | * | 1/2001 | Gesele et al. ................... | 701/1 |
| 6,195,606 B1 | * | 2/2001 | Barta et al. .................... | 701/70 |
| 6,198,988 B1 | * | 3/2001 | Tseng ............................. | 701/1 |

FOREIGN PATENT DOCUMENTS

| | | |
|---|---|---|
| DE | 196 36 443 | 3/1998 |
| DE | 197 08 508 | 3/1998 |
| EP | 0 751 888 | 1/1997 |

OTHER PUBLICATIONS

"FDR–die Fahrdynamikregelung von Bosch" Automobiltechnische Zeitschrift (ATZ), vol. 16, No. 11, pp. 674–689 (1994).**

* cited by examiner

Primary Examiner—Marc S. Hoff
Assistant Examiner—Carol S Tsai
(74) Attorney, Agent, or Firm—Kenyon & Kenyon

(57) ABSTRACT

A device is part if a device for regulating a motion variable representing the vehicle motion. This device is used to determine whether a vehicle is located on a road surface inclined across the direction of travel of the vehicle. The device has a first apparatus for detecting various variables describing the vehicle motion. Furthermore, this device contains a second apparatus with which identically defined comparison Variables are determined at least on the basis of the various variables describing the vehicle motion detected with the first apparatus. In the third apparatus of this device, plausibility queries are performed at least on the basis of the identically defined comparison variables to determine whether the vehicle is located on a road surface inclined across the direction of travel of the vehicle. The result of the determination performed with the third apparatus is taken into account in regulating the motion variable representing the vehicle motion.

12 Claims, 5 Drawing Sheets

METHOD AND DEVICE FOR REGULATING A QUANTITY OF MOTION REPRESENTING THE MOVEMENT OF A VEHICLE

BACKGROUND INFORMATION

The present invention relates to a method and device for regulating a motion variable representing vehicle motion by ascertaining whether the vehicle is located on a road surface inclined at an angle to the direction of travel of the vehicle. The determination of whether the vehicle is located on a road surface inclined at an angle to the direction of travel of the vehicle is performed at least on the basis of variables that are necessary for monitoring sensors used in the vehicle.

Devices and methods for monitoring sensors used in a vehicle are known from the related art in a variety of modifications.

German Published Patent application no. P 196 36 443 describes a method and a device for monitoring sensors in a vehicle, the sensors generating signals which each represent various physical variables. The device contains means with which identically defined comparison variables can be determined for at least two sensors on the basis of at least the signals generated by them. Furthermore, the device contains additional means with which a reference variable is determined as a function of at least the identically defined comparison variables thus determined. On the basis of at least the reference variable thus determined, monitoring is performed in monitoring means for at least one sensor. In addition to the monitoring means, the device also contains additional means with which, for at least one sensor, the signal generated by said sensor is corrected at least as a function of the reference variable.

The device and the method for monitoring sensors in a vehicle also has a steep curve detector. For this purpose, the corrected yaw rate is converted to a transverse acceleration, taking into account the speed of the vehicle. By comparing the converted transverse acceleration and a measured and offset-corrected transverse acceleration, it is possible to determine whether the vehicle is driving through a steep curve.

Methods and devices for determining whether a vehicle is located on a road surface inclined at an angle to the direction of travel of the vehicle are known in a variety of versions from the related art.

German Published Patent application no. P 197 08 508 describes a method and a device with which a transverse acceleration component depending on the inclination of the road surface is determined and/or with which the transverse acceleration of the vehicle is corrected at least as a function of the transverse acceleration component. With this method and device, various queries are first made to determine whether or not a steep curve condition is met. To determine whether the steep curve condition is met, a query, for example, is used to determine on the basis of the change in float angle and yaw rate of the vehicle, whether the vehicle is oversteered. Another query determines whether the driver is attempting to stabilize the vehicle by steering or braking. If the steep curve condition is met, then a vehicle status is found wherein the transverse acceleration component depending on the transverse inclination of the road surface is determined at least as a function of the slip angle on the rear axle of the vehicle. The transverse acceleration component thus determined as a function of the transverse inclination of the road surface is checked for plausibility and used to correct the transverse acceleration or yaw rate of the vehicle.

Methods and devices for regulating a motion variable representing the vehicle motion are known in a variety of modifications from the related art.

A method and a device for regulating the driving dynamics of a vehicle is described for example, in the article "FDR—the Bosch method of regulating driving dynamics" published in the automotive engineering journal *Automobiltechnische Zeitschrift* (ATZ), volume 16, number 11, 1994, pages 674–689. At the same time, this publication shows that different special situations such as an inclined road surface are also taken into account in the regulation in the driving dynamics regulator.

SUMMARY OF THE INVENTION

An object of the present invention is to improve upon the steep curve detection contained in a device and a method for monitoring sensors in a vehicle.

One advantage of the present invention in comparison with the related art cited above is that with the device and the method according to the present invention for determining whether a vehicle is located on a road surface that is inclined across the direction of travel of the vehicle, signals and variables that are already available from monitoring some of the sensors used in a vehicle are used for this purpose.

The device according to the present invention includes a first apparatus, in particular sensors, for detecting various variables descriptive of the vehicle motion. Furthermore, the device includes a second apparatus with which identically defined comparison variables for at least two of the first means are detected on the basis of at least the different variables which describe the vehicle motion and are detected with the first apparatus. The device advantageously also contains a third apparatus with which plausibility queries are performed at least on the basis of the identically defined comparison variables to ascertain whether the vehicle is located on a road surface inclined across the direction of travel of the vehicle. The result of the determination performed with the third means is taken into account in regulating the motion variable representing the vehicle motion.

It is of particular advantage when the result of the determination performed with the third apparatus is taken into account in determining the identically defined comparison variables and/or if the result of the determination performed with the third apparatus is taken into account in the third apparatus for monitoring at least one of the first apparatus, and/or if the result of the determination performed with the third apparatus is taken into account in a fourth apparatus which generate at least control signals for actuators at least on the basis of the various variables describing the vehicle motion detected with the first apparatus for regulating the motion variable representing the vehicle motion, the control signals being used to influence at least the forward drive and/or breaking torques acting on the wheels of the vehicle.

It is especially advantageous if the identically defined comparison variables determined with the second apparatus represent a physical variable or a variable describing the vehicle motion, preferably corresponding to a variable, in particular a yaw rate, detected with the first apparatus present in the vehicle.

The following plausibility queries are advantageously performed in the third apparatus and/or the following variables are determined for the plausibility queries:

On the basis of the identically defined comparison variables, at least one plausibility query is performed, determining whether the identically defined comparison variables are arranged in accordance with at least one predetermined arrangement as a function of their values. The minimum of one predetermined arrangement describes cornering on a road surface inclined across the direction of travel of the vehicle. On the basis of the identically defined comparison variables, at least one variable is determined which describes the deviation between the identically defined comparison variables. Furthermore, a variable is determined which describes the change in the difference over time, said difference being formed from a variable describing the transverse acceleration acting on the vehicle and a comparison variable for the transverse acceleration. To ascertain whether the vehicle is on a road surface inclined across the direction of travel of the vehicle, at least the result of the minimum of one plausibility query and/or the variable describing the deviation between the identically defined comparison variables and/or the variable describing the change over time in the difference formed from the variable describing the transverse acceleration acting on the vehicle and the comparison variable for the transverse acceleration is taken into account.

The comparison variable for the transverse acceleration is advantageously determined on the basis of a variable describing the vehicle speed and a reference variable formed at least on the basis of the identically defined comparison variables. The reference variable determined here represents a physical variable which preferably corresponds to a variable, in particular a yaw rate, determined with a first apparatus present in the vehicle.

To form the variable which describes the deviation between the identically defined comparison variables, a variable is advantageously determined for each of the identically defined comparison variables, describing the deviation in this identically defined comparison variable from the other identically defined comparison variables. It is especially advantageous if a variable describing the deviation of this identically defined comparison variable from the other identically defined comparison variables of this part of the identically defined comparison variables is determined to form the variable describing the deviation of the identically defined comparison variables from one another for part of the identically defined comparison variables for each of these identically defined comparison variables of this part.

Another advantage is that the variable describing the change over time in the difference formed from the variable describing the transverse acceleration acting on the vehicle and the comparison variable for the transverse acceleration is implemented in the form of a counter. This counter is incremented when the change over the time is greater than a first threshold value. It is decremented when the change over time is smaller than a second threshold value, and it approaches a predetermined value, in particular 0, when the difference over time remains almost unchanged.

Whether the vehicle is located on a road surface inclined across the direction of travel of the vehicle is advantageously determined with the help of a counter. If the counter status is greater than a predetermined threshold value, the vehicle is located on a road surface inclined across the direction of travel of the vehicle. The counter is advantageously incremented at least as a function of the following conditions: The minimum of one predetermined arrangement of the identically defined comparison variables exists and/or the variable describing the deviation between the identically defined comparison variables is greater than a first threshold value, or the absolute variable of the variable describing the change over time in the difference formed from the variable describing the transverse acceleration acting on the vehicle and the comparison variable for the transverse acceleration is greater than a second threshold value. The counter is advantageously decremented at least as a function of the following conditions: None of the predetermined arrangements of the identically defined comparison variables exists and/or the variable describing the deviation between the identically defined comparison variables is smaller than a first threshold value, and the absolute value of the variable describing the change over time in the difference formed from the variable describing the transverse acceleration acting on the vehicle and the comparison variable for the transverse acceleration is less than a second threshold value.

In addition, it has proven advantageous that the determination of whether the vehicle is located on a road surface inclined across the direction of travel of the vehicle is performed only when the variable describing the vehicle speed is greater than a respective threshold value and/or when the absolute value of a first identically defined comparison variable is greater than the absolute value of a second identically defined comparison variable.

DETAILED DESCRIPTION

It should be pointed out that blocks in different figures having the same notation also have the same function.

The present invention will now be described on the basis of FIGS. 1 through 4. It should be pointed out that the specific form of the embodiment selected—use of the device and method according to the present invention in a system for regulating the driving dynamics of a vehicle—is not intended to restrict the idea of the present invention in any way.

Figure 1:
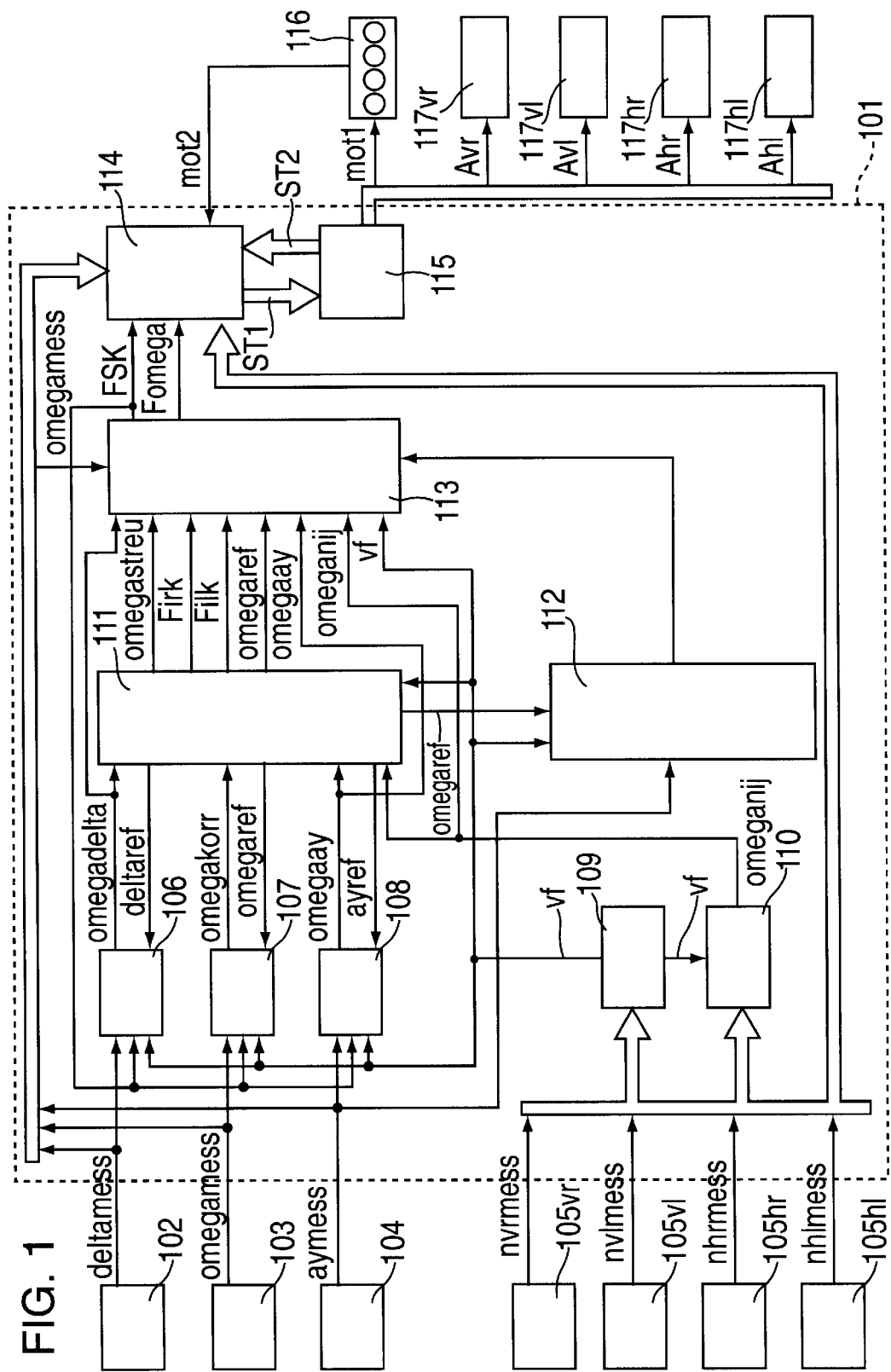
FIG. 1 shows the sensors and actuators used in a device for regulating a motion variable representing the vehicle motion, in particular those used in a system for regulating the driving dynamics of a vehicle, and also the structure of the control unit used in this system, taking into account the device according to the present invention.

In FIG. 1, block 101 is a control unit used in the device according to the present invention for carrying out the method according to the present invention.

A steering angle sensor 102 can detect a variable deltamess which describes the steering angle set on the vehicle. Signal deltamess generated with the help of steering angle sensor 102 is sent to block 106 as well as block 114. With the help of a rotational rate or yaw rate sensor 103, a variable describing the yaw of the vehicle about its vertical axis is obtained. Signal omegamess detected with the help of rotational rate sensor or yaw rate sensor 103 is sent to a block 107 as well as a block 114. A variable describing the transverse acceleration acting on the vehicle is detected with a transverse acceleration sensor 104. Signal aymess generated with the help of transverse acceleration sensor 104 is sent to blocks 108, 114 and 112. Blocks 105vr, 105vl, 105hr and 105hl are wheel rpm sensors provided for the wheels of the vehicle. Simplified notation 105ij is introduced below for the wheel rpm sensors, with index i indicating whether the wheel is on the rear axle (h) or on the front axle (v). Index j indicates the assignment to the right (r) or left (l) side of the vehicle. This characterization by two indices i and j is the same for all variables or components for which it is used. Signals nijmess generated with the help of wheel rpm sensors 105ij are sent to blocks 109, 110 and 114.

A variable vf describing the vehicle speed is generated in a block 109 on the basis of signals nijmess generated with wheel rpm sensors 105ij. This variable vf describing the vehicle speed is sent from block 109 to blocks 106, 108, 110, 111, 112 and a block 113. Variable vf may optionally also be sent to block 107.

Identically defined comparison variables for sensors 102, 103, 104 and 105ij are determined in blocks 106, 107, 108 and 110. In the present embodiment, it shall be assumed that the identically defined comparison variables for the sensors represent a yaw rate as the physical variable.

In a block 106, an identically defined comparison variable omegadelta is determined on the basis of signal deltamess, which is supplied to it, as well as variable vf describing the vehicle velocity plus variables FSK and deltaref supplied to it. Identically defined comparison variable omegadelta is sent from block 106 to blocks 111 and 113. Identically defined comparison variable omegadelta is determined in block 106 as follows, for example:

First, an offset value for signal deltamess is determined on the basis of signal deltamess, variable vf describing the vehicle velocity and a signal deltaref which describes a reference value for the steering angle detected with the help of steering angle sensor 102. In determining this offset value, variable FSK indicating whether the vehicle is located on a road surface inclined across the direction of travel of the vehicle is taken into account. For example, for the case when the vehicle is located on a road surface inclined across the direction of travel of the vehicle, formation of an instantaneous offset value can be blocked. In this case, the last offset value is frozen and used as long as the vehicle is located on a road surface inclined across the direction of travel of the vehicle. Signal deltamess is corrected on the basis of the offset value thus determined. Then with the help of a mathematical model, identically defined comparison variable omegadelta is determined from the corrected signal, taking into account variable vf which describes the vehicle velocity.

Identically defined comparison variable omegaay is determined in block 108 on the basis of signals aymess, vf, FSK and ayref sent to it in accordance with the determination of identically defined comparison variable omegadelta in block 106. Identically defined comparison variable omegaay is sent to block 111 as well as block 113.

As mentioned above, the identically defined comparison variables for the sensors represent a yaw rate as a physical variable, so that identically defined comparison variable omegakorr determined in block 107 corresponds to offset-corrected signal omegamess, because in this case it is not necessary to convert the offset-corrected sensor signal to a yaw rate with the help of a mathematical model. As described above in conjunction with blocks 106 and 108, an offset value for signal omegamess is determined in block 107 on the basis of signal omegamess and variables FSK and omegaref. With the help of this offset value, identically defined comparison variable omegakorr is calculated from signal omegamess. Variable omegakorr is sent to a block 111.

For the case when the identically defined comparison variables for the sensors represent a variable other than yaw rate as the physical variable, a conversion of the offset-corrected signal with the help of a mathematical model is also necessary in block 107. For this reason, supplying variable vf, which describes the vehicle velocity, to block 107 is indicated as optional.

In a block 110, an identically defined comparison variable omeganij is determined for wheel rpm sensors 105ij on the basis of signal nijmess, generated with the help of wheel rpm sensors 105ij, and on the basis of variable fv representing vehicle velocity. Identically defined comparison variable omeganij is sent from block 110 to blocks 111 and 113.

Various variables are determined in a block 111 on the basis of identically defined comparison variables omegadelta, omegakorr, omegaay and omeganij supplied to it as well as on the basis of the variable representing vehicle speed. First, in block 111 a reference variable omegaref is determined on the basis of identically defined comparison variables omegadelta, omegakorr, omegaay and omeganij. This can be done, for example, by forming a suitable average. Reference variable omegaref is sent from block 111 to blocks 107, 112 and 113. In addition, a variable omegastreu describing the deviation between the identically defined comparison variables is formed in block 111 on the basis of identically defined comparison variables omegadelta, omegakorr, omegaay and omeganij. Variable omegastreu is sent from block 111 to a block 113. Variable omegastreu can be determined by the following equation, for example:

$$\text{omegastreu} = \frac{1}{GEW1 + GEW2 + GEW3 + GEW4} \text{ where} \quad (1)$$

$$GEW1 = \frac{1}{|\text{omegakorr} - \text{omegadelta}| \cdot |\text{omegakorr} - \text{omeganij}| \cdot |\text{omegakorr} - \text{omegaay}|}, \quad (2)$$

$$GEW2 = \frac{1}{|\text{omegakorr} - \text{omegadelta}| \cdot |\text{omegadelta} - \text{omeganij}| \cdot |\text{omegadelta} - \text{omegaay}|}, \quad (3)$$

$$GEW3 = \frac{1}{|\text{omegakorr} - \text{omeganij}| \cdot |\text{omegadelta} - \text{omeganij}| \cdot |\text{omeganij} - \text{omegaay}|}, \quad (4)$$

$$GEW4 = \frac{1}{|\text{omegakorr} - \text{omegaay}| \cdot |\text{omegadelta} - \text{omegaay}| \cdot |\text{omeganij} - \text{omegaay}|}, \quad (5)$$

Equation (1) defines how variable omegastreu is obtained. Derivation of variables GEW1, GEW2, GEW3 and GEW4 contained in equation (1) is described by equations (2), (3), (4) and (5). As these equations indicate, variables GEW1, GEW2, GEW3 and GEW4 each represent a variable describing the deviation between this identically defined comparison variable and the other identically defined comparison variables for each identically defined comparison variable.

It can be noted here that variable GEW1 is formed for identically defined variable omegakorr, variable GEW2 is formed for identically defined variable omegadelta, variable GEW3 is formed for identically defined variable omeganij and variable GEW4 is formed for identically defined variable omegaay.

Optionally in addition to the above equation, variable omegastreu may also be determined only on the basis of identically defined comparison variables omegadelta, omeganij and omegaay. This has the advantage that variable omegastreu can also be used for monitoring the yaw rate sensor in addition to determining whether the vehicle is located on a road surface inclined across the direction of travel of the vehicle. In this case, variable omegastreu is derived according to the following equations:

$$\text{omegastreu} = \frac{1}{GEW2' + GEW3' + GEW4'} \text{ where} \quad (6)$$

$$GEW2' = \frac{1}{|\text{omegadelta} - \text{omeganij}| \cdot |\text{omegadelta} - \text{omegaay}|}, \quad (7)$$

$$GEW3' = \frac{1}{|\text{omegadelta} - \text{omeganij}| \cdot |\text{omeganij} - \text{omegaay}|}, \quad (8)$$

$$GEW4' = \frac{1}{|\text{omegadelta} - \text{omegaay}| \cdot |\text{omeganij} - \text{omegaay}|}. \quad (9)$$

As shown by equations (6), (7), (8) and (9), only part of the identically defined comparison variables is used to form variable omegastreu which describes the deviation between the identically defined comparison variables. For this part of the identically defined comparison variables, variables GEW2', GEW3' and GEW4' represent variables describing, for each of these identically defined comparison variables of this part of the identically defined comparison variables, the deviation between this identically defined comparison variable and the other identically defined comparison variables of this part. It is especially advantageous if signal omegastreu is passed through a low-pass filter before further processing in block 113. Assignment of the identically defined comparison variables to individual variables GEW2, GEW3 and GEW4 corresponds to that in the preceding set of equations.

Furthermore, variables Firk and Filk are determined in block 111. Variables Firk and Filk indicate whether the identically defined comparison variables are arranged in a predetermined arrangement in accordance with their value, with the predetermined arrangement describing cornering on a road surface inclined across the direction of travel of the vehicle. Variable Firk indicates whether the vehicle is in a right-handed curve with an inclination toward the inside, and variable Filk indicates whether the vehicle is located on a left-handed curve with the inclination toward the inside. Both variables Firk and Filk are sent from block 111 to a block 113.

In addition to the variables described above, the other above-mentioned variables deltaref and ayref, representing a sensor reference variable for the respective sensor, are generated in block 111. These variables are determined on the basis of reference variable omegaref by using a suitable mathematical model, taking into account variable vf representing the vehicle speed. Variable deltaref is sent from block 111 to block 106, while variable ayref is sent to block 108. Reference value omegaref is used for sensor 103; for this purpose, reference value omegaref is sent from block 111 to block 107.

A variable taykomp describing the change over time in the difference formed from the variable or signal aymess describing the transverse acceleration acting on the vehicle and a comparison variable for transverse acceleration is determined in a block 112 on the basis of signal aymess, variable vf describing the vehicle speed and reference variable omegaref. Variable taykomp is sent from block 112 to a block 113.

Two things happen in block 113. First, block 113 determines on the basis of signals omegadelta, omeganij, omegastreu, Firk, Filk and variable vf describing the vehicle speed whether the vehicle is located on a road surface inclined across the direction of travel of the vehicle. The result of this determination is sent from block 113 to a block 114 and to blocks 106, 107 and 108 with the help of variable FSK. Second, monitoring for at least the rotational rate sensor or yaw rate sensor 103 takes place in block 113. Variables omegadelta, omegaay, omeganij, omegaref, signal omegamess and variable tsteilw, generated in block 113 in conjunction with the determination of whether the vehicle is located on a road surface inclined across the direction of travel of the vehicle enter into the monitoring of the rotational rate sensor or yaw rate sensor 103. On the basis of these variables, plausibility queries are performed on the basis of which rotational rate sensor or yaw rate sensor 103 is monitored. The result of this monitoring is sent from block 113 to 114 with the help of variable Fomega.

In block 113, in addition to rotational rate sensor or yaw rate sensor 103, steering angle sensor 102 and/or transverse acceleration sensor 104 can be monitored. Signals can also be generated on the basis of block 113 for these two sensors and used to notify block 114 whether or not the respective sensor is faulty.

The block labeled as 114 is the regulator of control unit 101. Measurement signals deltamess, omegamess, aymess and nijmess are sent to block 114. Furthermore, block 114 receives from engine 116 a signal mot2 which describes engine rpm, for example. Furthermore, block 114 receives signals ST2 from a block 115, which is the control logic for actuators 117$ij$ and the engine. These signals may be, for example, control times Aij of actuators 117$ij$, which are designed as brakes in particular. Regulator 114 determines signals ST1 on the basis of the measurement signals, signals ST2, and by taking into account variables FSK and Fomega and in accordance with the control implemented in it, and these signals ST1 are sent to control logic 115. If regulator 114 is notified by signal FSK that the vehicle is located on a road surface inclined across the direction of travel of the vehicle, then the formation of signals ST1 can be modified. The same thing is true if regulator 114 is notified with the help of signal Fomega that rotational rate sensor or yaw rate sensor 103 is defective.

A control signal mot1 for engine 116 and control signals Aij for actuators 117$ij$ are determined in block 115 on the basis of signals ST1 supplied to it. A motion variable representing the vehicle motion is regulated through the corresponding control of engine 116 and actuators 117$ij$ which are designed as brakes in particular. The status of actuators 117$ij$, for example, is relayed to regulator 114 with signals ST2 generated in block 115.

Figure 2:
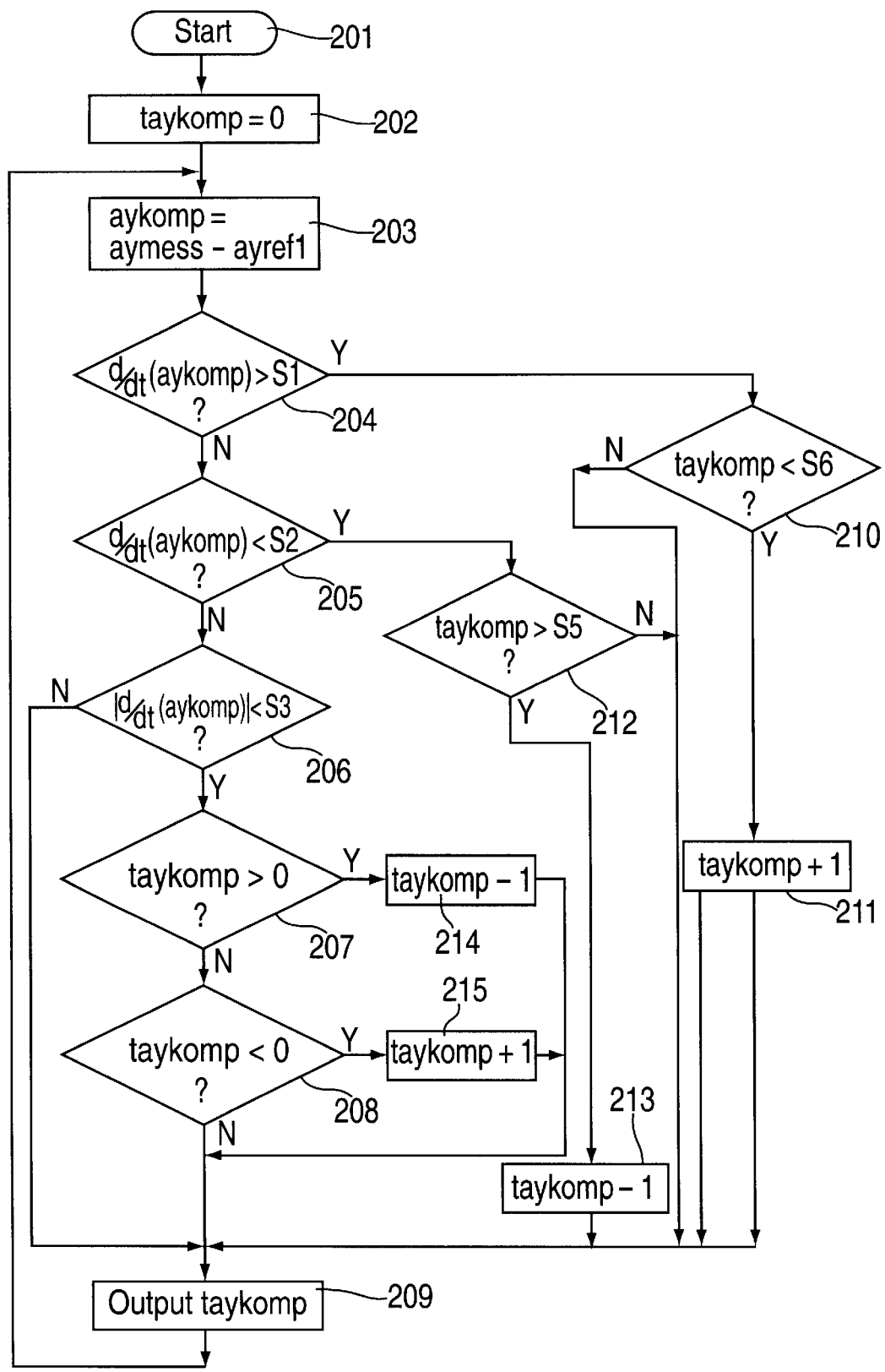
FIG. 2 illustrates a flow chart showing the determination of the variable describing the change over time in the difference formed from the variable describing the transverse acceleration acting on the vehicle and the comparison variable for the transverse acceleration.

The flow chart in FIG. 2 shows the determination in block 112 of variable taykomp, which describes the change over time in the difference formed from the variable or signal aymess which describes the transverse acceleration acting on the vehicle and a comparison variable for the transverse acceleration.

Determination of variable taykomp begins with a step 201. Step 201 is followed by step 202, where variable taykomp is assigned a value of 0. This value assignment represents an initialization of variable taykomp such as that performed, for example, when turning the ignition key when starting to drive. A step 203 is carried out following step 202. A variable aykomp is formed in step 203 by forming the difference between variable aymess and a variable ayref1. Variable ayref1 is a reference variable for the transverse acceleration. Variable ayref1 is formed on the basis of variable vf which describes the vehicle speed and reference variable omegaref. Consequently, variable aykomp represents the deviation of the measured transverse acceleration from a respective comparison variable. Following step 203, a step 204 is carried out.

Step 204 determines whether the rate of change d/dt (aykomp) in variable aykomp is greater than a first threshold value S1. Threshold value S1 is a small positive value. If the rate of change in variable aykomp is smaller than first threshold value S1, then a step 205 is carried out following step 204. However, if the rate of change in variable aykomp is greater than the first threshold value, i.e., aykomp increases monotonically with a minimum value, then a step 210 is carried out following step 204.

In step 210, a check is performed to determine whether the value of variable taykomp is smaller than a comparison variable S6. If it is found in step 210 that the value of variable taykomp is less than comparison variable S6, then a step 211 is carried out following step 210. However, if it is found in step 210 that the value of variable taykomp is greater than comparison variable S6, then a step 209 is carried out following step 210. Comparison variable S6 represents a large positive value; for example, comparison value S6 may assume a value of 25.

In step 211, variable taykomp, which is implemented as a counter in particular, is incremented, i.e., it is increased by 1. A step 209 is carried out following step 211.

In step 205 the rate of change d/dt(aykomp) in variable aykomp is compared with a second threshold value S2. Threshold value S2 is a small negative value. If the rate of change in variable aykomp is smaller than second threshold value S2, i.e., variable aykomp decreases monotonically with a minimum value, then a step 212 is carried out following step 205. However, if the rate of change in variable aykomp is greater than second threshold value S2, a step 206 is carried out following step 205.

Step 212 determines whether the value of variable taykomp is greater than a comparison variable S5. If it is found in step 212 that the value of variable taykomp is greater than comparison variable S5, then a step 213 is carried out following step 212. However, if it is found in step 212 that the value of variable taykomp is smaller than comparison variable S5, then step 209 is carried out following step 212. Comparison value S5 is a relatively great negative number; for example, comparison value S5 may assume a value of −25.

In step 213, variable taykomp is decremented, i.e., it is reduced by 1. Step 209 is carried out following step 213.

The absolute value of rate of change d/dt (aykomp) is compared with a third threshold value S3 in step 206. Third threshold value S3 is a very small number, in particular the number 0. If it is found in step 206 that the value of the rate of change in variable aykomp is greater than third threshold value S3, then step 209 is carried out following step 206. However, if it is found in step 206 that the value of the rate of change in variable aykomp is smaller than third threshold value S3, then a step 207 is carried out following step 206.

Step 207 determines whether variable taykomp is greater than 0. If it is found in step 207 that the variable taykomp is greater than 0, then a step 214 is carried out following step 207, decrementing variable taykomp. Following step 214, step 209 is carried out. However, if it is found in step 207 that variable taykomp is not greater than 0, then a step 208 is carried out following 207.

In step 208 a check is performed to determine whether variable taykomp is less than 0. If it is found in step 208 that variable taykomp is less than 0, then a step in which variable taykomp is incremented is carried out following step 208. Step 209 is carried out following step 215. However, if it is found in step 208 that variable taykomp is not less than 0, then step 209 is carried out following step 208.

In step 209, the value of variable taykomp is output, i.e., it is made available to any other regulators which might be present, for example. Following step 209, step 203 is carried out again.

It should be pointed out here that the query in step 206 is used to determine whether variable aykomp has reached a steady state. In other words, it determines whether the difference formed from aymess and comparison variable ayref1 remains almost unchanged over time. Variable taykomp is approximated to a predetermined value by steps 207, 208, 214 and 215 for the case when variable aykomp has reached a steady state. This predetermined value may be the value 0 in particular.

In conclusion, it should be pointed out that it may be advantageous if all the threshold values and/or comparison variables contained in FIG. 2 are varied as a function of the variable describing vehicle speed vf.

Figure 3A:
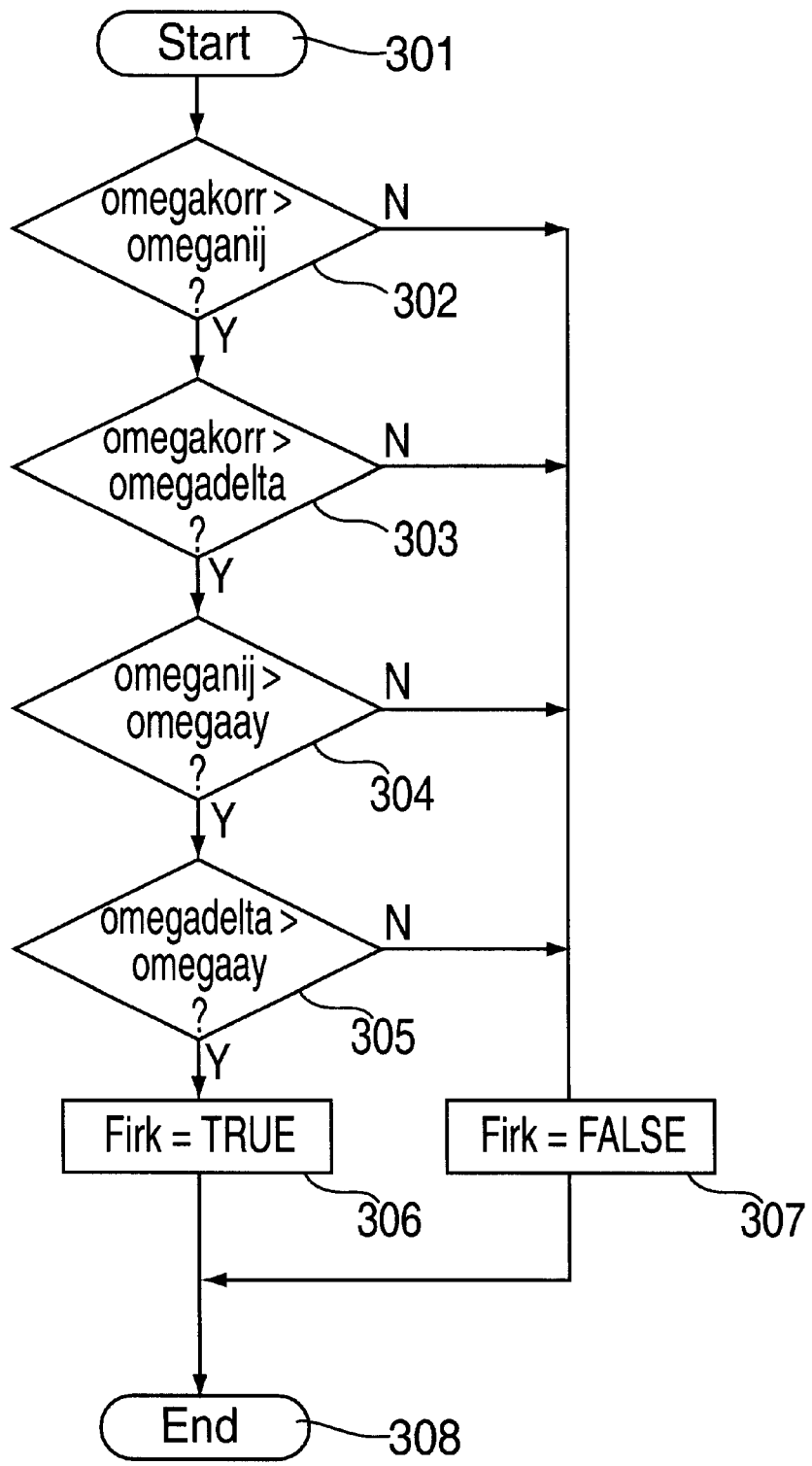
FIG. 3a illustrates a first flow chart showing a plausibility query which ascertains whether the identically defined comparison variables are arranged in a first predetermined arrangement in accordance with their values.

FIG. 3a shows with the help of a flow chart a plausibility query composed of individual queries, determining whether the identically defined comparison variables are arranged in a first predetermined arrangement in accordance with their value. This arrangement describes cornering on a road surface inclined across the direction of travel of the vehicle; in particular, it describes cornering on a right-handed curve with an inward inclination.

The plausibility query begins with a step 301. Following step 301, a step 302 is carried out, where a check is performed to determine whether identically defined comparison variable omegakorr is greater than identically defined comparison variable omeganij. If it is found in step 302 that variable omegakorr is greater than variable omeganij, then a step 303 is carried out following step 302. However, if it is found in step 302 that variable omegakorr is smaller than variable omeganij, then a step 307 is carried out following step 302. In step 307, the value FALSE is assigned to variable Firk. Following step 307, a step 308 is carried out, terminating the plausibility query.

In step 303, a check is performed to determine whether identically defined comparison variable omegakorr is greater than identically defined comparison variable omegadelta. If it is found in step 303 that variable omegakorr is greater than variable omegadelta, then a step 304 is carried out following step 303. However, if it is found in step 303 that variable omegakorr is smaller than variable omegadelta, then step 307 is carried out following step 303.

In step 304, a check is performed to determine whether identically defined comparison variable omeganij is greater than identically defined comparison variable omegaay. If it is found in step 304 that variable omeganij is greater than variable omegaay, then a step 305 is carried out following step 304. If, however, it is found in step 304 that variable omeganij is smaller than variable omegaay, then step 307 is carried out following step 304, In step 305 a check is performed to determine whether identically defined comparison variable omegadelta is greater than identically defined comparison variable omegaay. If it is found in step 305 that variable omegadelta is greater than variable omegaay, then a step 306 is carried out following step 305. The value TRUE is assigned to variable Firk in step 306. Following step 306, step 308 is carried out. However, if it is found in step 305 that variable omegadelta is smaller than variable omegaay, then step 307 is carried out following step 305.

If the value TRUE is assigned to variable Firk, then the identically defined comparison variables are arranged in a predetermined order in accordance with their values, i.e. the motor vehicle is located on a right-handed curve with an inward inclination.

Figure 3B:
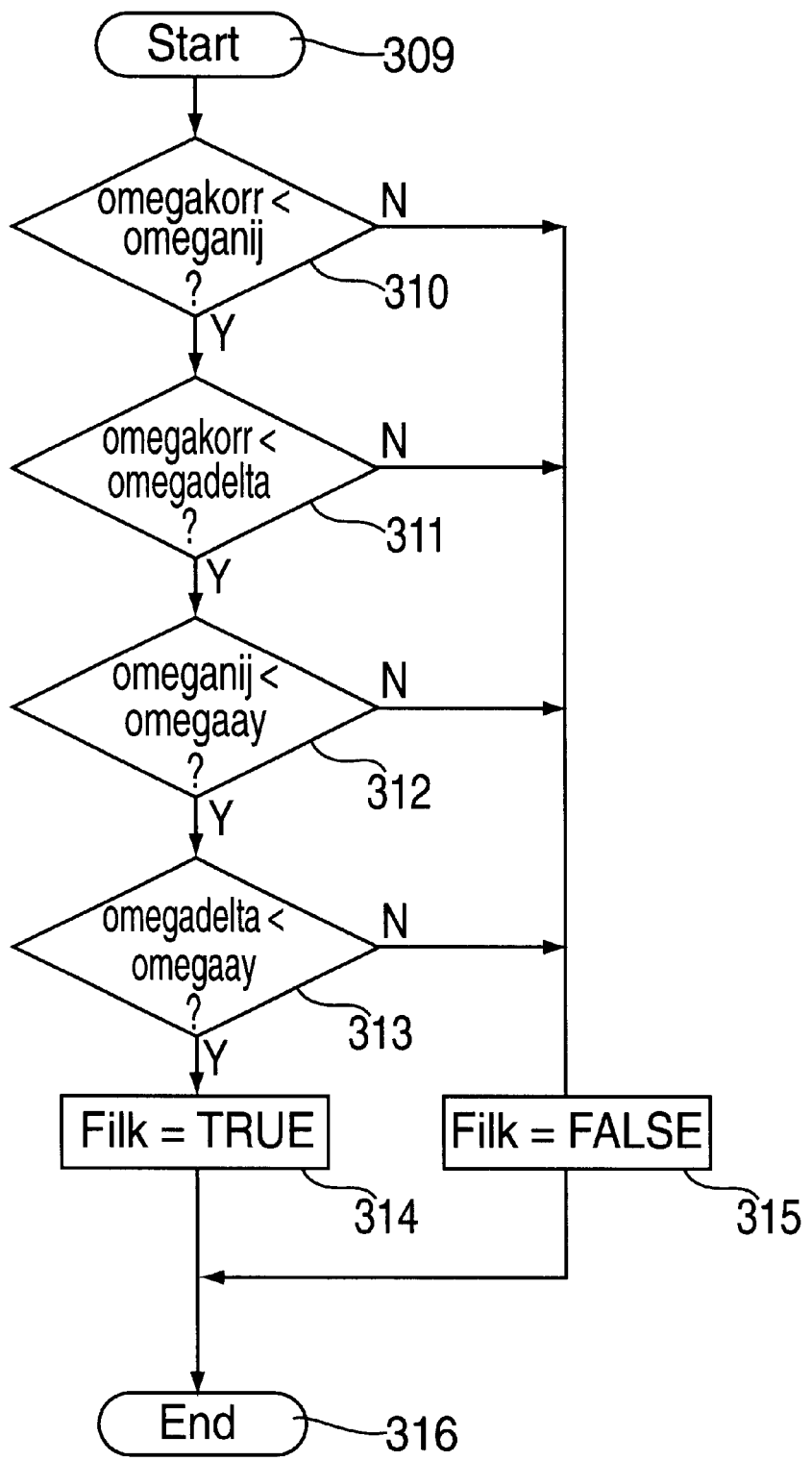
FIG. 3b illustrates a second flow chart showing a plausibility query which ascertains whether the identically defined comparison variables are arranged in a second predetermined arrangement in accordance with their values.

FIG. 3b shows with the help of a flow chart a plausibility query which determines whether the identically defined comparison variables are arranged in a second predetermined arrangement in accordance with their values. The predetermined arrangement describes cornering on a road surface inclined across the direction of travel of the vehicle, in particular turning left on a road surface with an inward inclination.

The plausibility query begins with a step 309 followed by a step 310. In step 310, a check is performed to determine whether identically defined comparison variable omegakorr is smaller than identically defined comparison variable omeganij. If it is found in step 310 that variable omegakorr is smaller than variable omeganij, then a step 311 is carried out following step 310. However, if it is found in step 310 that variable omegakorr is greater than variable omeganij, then a step 315 is carried out following step 310. The value FALSE is assigned to variable Filk in step 315. Following step 315, a step 316 is carried out, terminating the plausibility query.

A check is performed in step 311 to determine whether identically defined comparison variable omegakorr is smaller than identically defined comparison variable omegadelta. If it is found in step 311 that variable omegakorr is smaller than variable omegadelta, then a step 312 is carried out following step 311. However, if it is found in step 311 that variable omegakorr is greater than variable omegadelta, then step 315 is carried out following step 311.

In step 312 a check is performed to determine whether identically defined comparison variable omeganij is smaller than identically defined comparison variable omegaay. If it is found in step 312 that variable omeganij is smaller than variable omegaay, then a step 313 is carried out following step 312. However, if it is found in step 312 that variable omeganij is greater than variable omegaay, then step 315 is carried out following step 312.

In step 313 a check is performed to determine whether identically defined comparison variable omegadelta is smaller than identically defined comparison variable omegaay. If it is found in step 313 that variable omegadelta is smaller than variable omegaay, then a step 314 is carried out following step 313. In step 314 variable Filk is assigned a value of TRUE. Following step 314, step 316 is carried out. However, if it is found in step 313 that variable omegadelta is greater than variable omegaay, then step 315 is carried out following step 313.

A value of TRUE may be assigned to variable Filk when the identically defined comparison variables are arranged in accordance with the predetermined arrangement, i.e., the vehicle is on a left-handed curve with an inward inclination.

Figure 4:
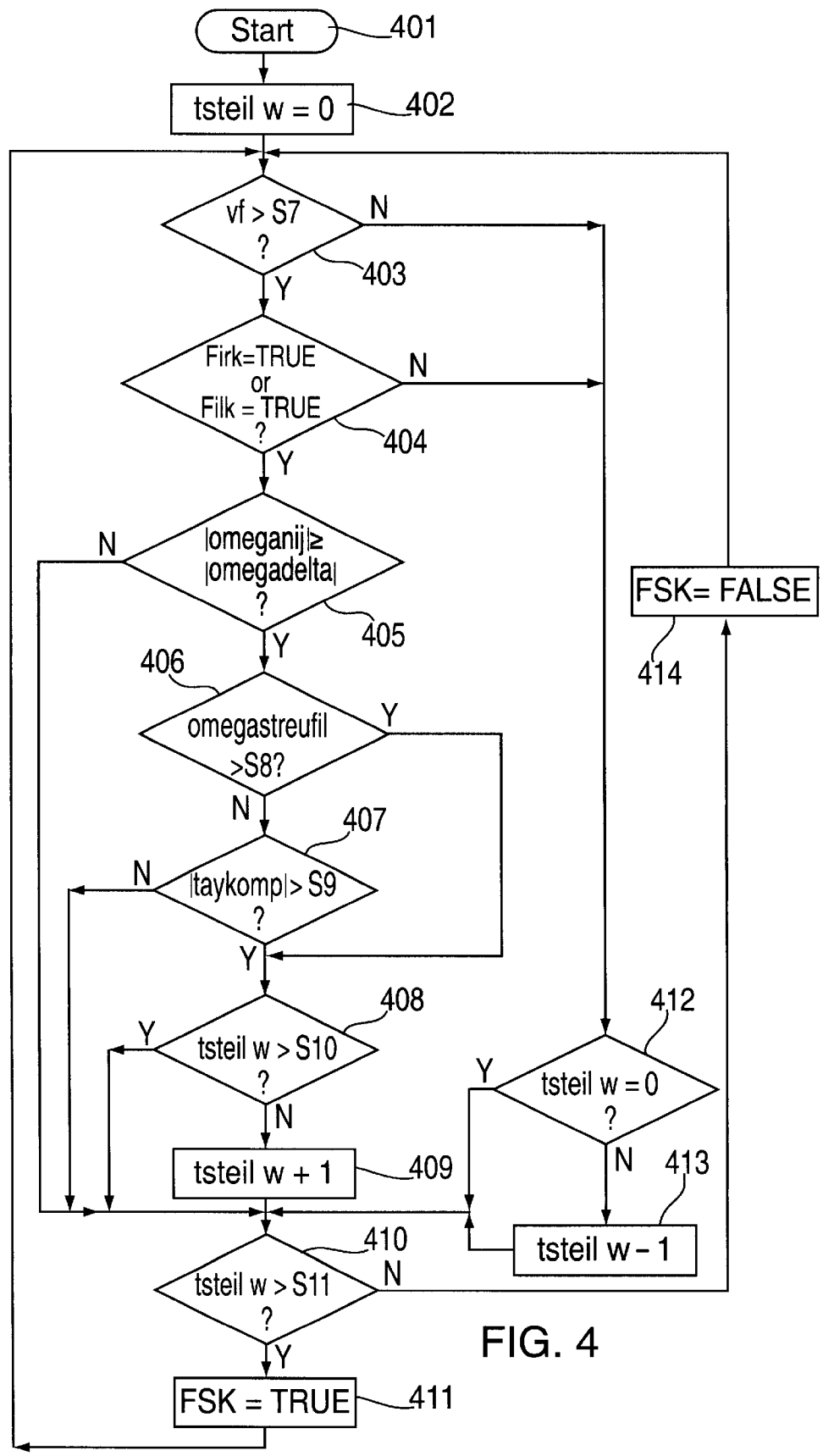
FIG. 4 illustrates a flow chart showing the plausibility queries for determining whether the vehicle is located on a road surface inclined across the direction of travel of the vehicle.

FIG. 4 shows, with the help of a flow chart, the plausibility queries performed to determine whether the vehicle is located on a road surface inclined across the direction of travel of the vehicle.

The determination of whether the vehicle is located on a road surface inclined across the direction of travel of the vehicle begins with step 401. Following step 401, a step 402 is carried out, where a value of 0 is assigned to variable tsteilw which is designed as a counter in particular. Following step 402, a step 403 is carried out.

Variable vf which describes the vehicle speed is compared with a seventh threshold value S7 in step 403. If it is found in step 403 that variable vf describing the vehicle speed is greater than threshold value S7, then a step 404 is carried out following step 403. However, if it is found in step 403 that variable vf describing the vehicle speed is smaller than threshold value S7, which is a positive value, then a step 412 is carried out following step 403.

In step 412 a check is performed to determine whether variable tsteilw is equal to value 0. If it is found in step 412 that variable tsteilw is equal to value 0, then a step 410 is carried out following step 412. However, if it is found in step 412 that variable tsteilw is not equal to 0, then a step 413 is carried out following step 412, decrementing variable tsteilw. A step 410 is carried out following step 413.

In step 404 a check is performed to determine whether a value of TRUE is assigned to variable Firk or a value of TRUE is assigned to variable Filk. If the query performed in step 404 is answered in the affirmative, a step 405 is carried out following step 404. However, if the query in step 404 is answered in the negative, then step 412 is carried out following step 404.

A check is performed in step 405 to determine whether the absolute value of identically defined comparison variable omeganij is greater than or equal to the value of identically defined comparison variable omegadelta. If it is found in step 405 that the absolute value of identically defined comparison variable omeganij is greater than or equal to the absolute value of identically defined comparison variable omegadelta, then a step 406 is carried out following step 405. However, if it is found in step 405 that the absolute value of identically defined comparison variable omeganij is not greater than or equal to the absolute value of identically defined comparison variable omegadelta, then step 410 is carried out following step 405.

A check is performed in step 406 to determine whether variable omegastreufil is greater than an eighth threshold value S8. It should be pointed out here that variable omegastreufil is derived from variable omegastreu by filtering as described above. If it is found in step 406 that variable omegastreufil is greater than threshold value S8 which is a positive value, then a step 408 is carried out following step 406. However, if it is found in step 406 that variable omegastreufil is not greater than threshold value S8, then a step 407 is carried out following step 406. A check is performed in step 407 to determine whether the absolute value of variable taykomp is greater than a threshold value S9. Threshold value S9 is a positive value. If it is found in step 407 that the absolute value of variable taykomp is greater than threshold value S9, then step 408 is carried out following step 407. For the case when the query performed in step 407 is answered in the negative a step 410 is carried out following step 407.

A check is performed in step 408 to determine whether variable tsteilw is greater than a threshold value S10. Threshold value S10 has a positive value. If it is found in step 408 that variable tsteilw is greater than threshold value S10, then a step 410 is carried out following step 408. However, if it is found in step 408 that variable tsteilw is not greater than threshold value S10, then a step 409 is carried out following step 408, incrementing variable tsteilw. A step 410 is carried out following step 409.

A check is performed in step 410 to determine whether variable tsteilw is greater than a threshold value S11. Threshold value S11 is a positive value. It should be pointed out here that the value of threshold value S11 is smaller than the value of threshold value S10. If it is found in step 410 that variable tsteilw is greater than threshold value S11, then a step 411 is carried out following step 410, assigning a value TRUE to variable FSK, because it has been found on the basis of the query performed in step 410 that the vehicle is located on a road surface inclined across the direction of travel of the vehicle. Following step 411, step 403 is carried out. However, if it is found in step 410 that variable tsteilw is not greater than threshold value S11, then a step 414 is carried out following step 410, assigning a value of FALSE to variable FSK, because it has been found on the basis of the query performed in step 410 that the vehicle is not on a road surface inclined across the direction of travel of the vehicle. Then step 403 is carried out following step 414.

It should be pointed out in conclusion that the form of the embodiment selected in the description and the presentation in the flow charts selected for FIGS. 2, 3a, 3b and 4 are not intended to restrict in any way the scope of the idea essential to the present invention.

What is claimed is:

1. A device for regulating a motion variable representing a vehicle motion of a vehicle, comprising:

a first apparatus for detecting a plurality of variables corresponding to the vehicle motion, each one of the plurality of variables corresponding to the vehicle motion being different from another one of the plurality of variables corresponding to the vehicle motion;

a second apparatus for determining a plurality of identically defined comparison variables for at least two elements of the first apparatus on the basis of at least the plurality of variables corresponding to the vehicle motion; and a third apparatus for performing a plurality of plausibility queries at least on the basis of the plurality of identically defined comparison variables in order to perform a determination as to whether the vehicle is located on a road surface inclined transversely to a direction of travel of the vehicle, wherein a result of the determination is taken into account in regulating the motion variable representing the vehicle motion.

2. The device according to claim 1, further comprising a fourth apparatus, wherein the result of the determination performed in the third apparatus is taken into account in at least one of:

determining the plurality of identically defined comparison variables, monitoring at least one element of the first apparatus in the third apparatus, causing the fourth apparatus to provide, at least on the basis of the plurality of variables corresponding to the vehicle motion, at least a plurality of control signals for a plurality of actuators for regulating the motion variable representing the vehicle motion, and the plurality of control signals influences at least one of a forward driving torque and a braking torque acting on a plurality of wheels of the vehicle.

3. The device according to claim 1, wherein:

the plurality of identically defined comparison variables represents one of a physical variable and a variable corresponding to a yaw rate and detected by the first apparatus present in the vehicle.

4. The device according to claim 1, wherein:

at least one plausibility query is performed in the third apparatus on the basis of the plurality of identically defined comparison variables to determine whether the plurality of identically defined comparison variables is arranged in at least one predetermined arrangement in accordance with values of the plurality of identically defined comparison variables, at least one of a minimum of the at least one predetermined arrangement corresponds to a cornering on the road surface inclined across the direction of travel of the vehicle, at least one variable corresponding to a deviation between the plurality of identically defined comparison variables is determined in the third apparatus on the basis of the plurality of identically defined comparison variables, a variable corresponding to a change over time in a difference formed from a variable detected with the first apparatus corresponding to a transverse acceleration acting on the vehicle and a comparison variable for the transverse acceleration is determined in the third apparatus on the basis of the variable corresponding to the transverse acceleration and the comparison variable, and at least one of a result of a minimum of one plausibility query, the at least one variable corresponding to the deviation between the plurality of identically defined comparison variables, and the variable corresponding to the change over time in the difference formed from the variable corresponding to the transverse acceleration acting on the vehicle and the comparison variable for the transverse acceleration is taken into account in determining whether the vehicle is on the road surface inclined across the direction of travel of the vehicle.

5. A device for regulating a motion variable representing a vehicle motion of a vehicle, comprising:

a first apparatus for detecting a plurality of variables corresponding to the vehicle motion, each one of the plurality of variables corresponding to the vehicle motion being different from another one of the plurality of variables corresponding to the vehicle motion;

a second apparatus for determining a plurality of identically defined comparison variables for at least two elements of the first apparatus on the basis of at least the plurality of variables corresponding to the vehicle motion; and a third apparatus for performing a plurality of plausibility queries at least on the basis of the plurality of identically defined comparison variables in order to perform a determination as to whether the vehicle is located on a road surface inclined transversely to a direction of travel of the vehicle, wherein a result of the determination is taken into account in regulating the motion variable representing the vehicle motion, wherein:

at least one plausibility query is performed in the third apparatus on the basis of the plurality of identically defined comparison variables to determine whether the plurality of identically defined comparison variables is arranged in it least one predetermined arrangement in accordance with values of the plurality of identically defined comparison variables, at least one of a minimum of the at least one predetermined arrangement corresponds to a cornering on the road surface inclined across the direction of travel of the vehicle, at least one variable corresponding to a deviation between the plurality of identically defined comparison variables is determined in the third apparatus on the basis of the plurality of identically defined comparison variables, a variable corresponding to a change over time in a difference formed from a variable detected with the first apparatus corresponding to a transverse acceleration acting on the vehicle and a comparison variable for the transverse acceleration is determined in the third apparatus on the basis of the variable corresponding to the transverse acceleration and the comparison variable, at least one of a result of a minimum of one plausibility query, the at least one variable corresponding to the deviation between the plurality of identically defined comparison variables, and the variable corresponding to the change over time in the difference formed from the variable corresponding to the transverse acceleration acting on the vehicle and the comparison variable for the transverse acceleration is taken into account in determining whether the vehicle is on the road surface inclined across the direction of travel of the vehicle, a variable corresponding to a vehicle speed of the vehicle is determined at least on the basis of at least some of the plurality of variables corresponding to the vehicle motion, at least one reference variable is determined on the basis of the plurality of identically defined comparison variables, and the comparison variable for the transverse acceleration is determined at least on the basis of the variable corresponding to the vehicle speed and the at least one reference variable.

6. A device for regulating a motion variable representing a vehicle motion of a vehicle, comprising:

a first apparatus for detecting a plurality of variables corresponding to the vehicle motion, each one of the plurality of variables corresponding to the vehicle motion being different from another one of the plurality of variables corresponding to the vehicle motion;

a second apparatus for determining a plurality of identically defined comparison variables for at least two elements of the first apparatus on the basis of at least the plurality of variables corresponding to the vehicle motion; and a third apparatus for performing a plurality of plausibility queries at least on the basis of the plurality of identically defined comparison variables in order to perform a determination as to whether the vehicle is located on a road surface inclined transversely to a direction of travel of the vehicle, wherein a result of the determination is taken into account in regulating the motion variable representing the vehicle motion, wherein:

at least one plausibility query is performed in the third apparatus on the basis of the plurality of identically defined comparison variables to determine whether the plurality of identically defined comparison variables is arranged in al: least one predetermined arrangement in accordance with values of the plurality of identically defined comparison variables, at least one of a minimum of the at least one predetermined arrangement corresponds to a cornering on the road surface inclined across the direction of travel of the vehicle, at least one variable corresponding to a deviation between the plurality of identically defined comparison variables is determined in the third apparatus on the basis of the plurality of identically defined comparison variables, a variable corresponding to a change over time in a difference formed from a variable detected with the first apparatus corresponding to a transverse acceleration acting on the vehicle and a comparison variable for the transverse acceleration is determined in the third apparatus on the basis of the variable corresponding to the transverse acceleration and the comparison variable, at least one of a result of a minimum of one plausibility query, the at least one variable corresponding to the deviation between the plurality of identically defined comparison variables, and the variable corresponding to the change over time in the difference formed from the variable corresponding to the transverse acceleration acting on the vehicle and the comparison variable for the transverse acceleration is taken into account in determining whether the vehicle is on the road surface inclined across the direction of travel of the vehicle; and wherein in order to form the at least one variable corresponding to the deviation between the plurality of identically defined comparison variables on the basis of each of the plurality of identically defined comparison variables, a variable is determined for each deviation between each identically defined comparison variable and another identically defined comparison variable.

7. A device for regulating a motion variable representing a vehicle motion of a vehicle, comprising:

a first apparatus for detecting a plurality of variables corresponding to the vehicle motion, each one of the plurality of variables corresponding to the vehicle motion being different from another one of the plurality of variables corresponding to the vehicle motion;

a second apparatus for determining a plurality of identically defined comparison variables for at least two elements of the first apparatus on the basis of at least the plurality of variables corresponding to the vehicle motion; and a third apparatus for performing a plurality of plausibility queries at least on the basis of the plurality of identically defined comparison variables in order to perform a determination as to whether the vehicle is located on a road surface inclined transversely to a direction of travel of the vehicle, wherein a result of the determination is taken into account in regulating the motion variable representing the vehicle motion, wherein:

at least one plausibility query is performed in the third apparatus on the basis of the plurality of identically defined comparison variables to determine whether the plurality of identically defined comparison variables is arranged in at least one predetermined arrangement in accordance with values of the plurality of identically defined comparison variables, at least one of a minimum of the at least one predetermined arrangement corresponds to a cornering on the road surface inclined across the direction of travel of the vehicle, at least one variable corresponding to a deviation between the plurality of identically defined comparison variables is determined in the third apparatus on the basis of the plurality of identically defined comparison variables, a variable corresponding to a change over time in a difference formed from a variable detected with the first apparatus corresponding to a transverse acceleration acting on the vehicle and a comparison variable for the transverse acceleration is determined in the third apparatus on the basis of the variable corresponding to the transverse acceleration and the comparison variable, and at least one of a result of a minimum of one plausibility query, the at least one variable corresponding to the deviation between the plurality of identically defined comparison variables, and the variable corresponding to the change over time in the difference formed from the variable corresponding to the transverse acceleration acting on the vehicle and the comparison variable for the transverse acceleration is taken into account in determining whether the vehicle is on the road surface inclined across the direction of travel of the vehicle; and wherein in order to form the at least one variable corresponding to the deviation between the plurality of identically defined comparison variables for at least a part of the plurality of identically defined comparison variables, a variable corresponding to the deviation between each identically defined comparison variable and the other identically defined comparison variables of the part of the identically defined comparison variables is determined for each of the identically defined comparison variables of the part of the identically defined comparison variables.

8. A device for regulating a motion variable representing a vehicle motion of a vehicle, comprising:

a first apparatus for detecting a plurality of variables corresponding to the vehicle motion, each one of the plurality of variables corresponding to the vehicle motion being different from another one of the plurality of variables corresponding to the vehicle motion;

a second apparatus for determining a plurality of identically defined comparison variables for at least two elements of the first apparatus on the basis of at least the plurality of variables corresponding to the vehicle motion; and a third apparatus for performing a plurality of plausibility queries at least on the basis of the plurality of identically defined comparison variables in order to perform a determination as to whether the vehicle is located on a road surface inclined transversely to a direction of travel of the vehicle, wherein a result of the determination is taken into account in regulating the motion variable representing the vehicle motion, wherein:

at least one plausibility query is performed in the third apparatus on the basis of the plurality of identically defined comparison variables to determine whether the plurality of identically defined comparison variables is arranged in at least one predetermined arrangement in accordance with values of the plurality of identically defined comparison variables, at least one of a minimum of the at least one predetermined arrangement corresponds to a cornering on the road surface inclined across the direction of travel of the vehicle, at least one variable corresponding to a deviation between the plurality of identically defined comparison variables is determined in the third apparatus on the basis of the plurality of identically defined comparison variables, a variable corresponding to a change over time in a difference formed from a variable detected with the first apparatus corresponding to a transverse acceleration acting on the vehicle and a comparison variable for the transverse acceleration is determined in the third apparatus on the basis of the variable corresponding to the transverse acceleration and the comparison variable, at least one of a result of a minimum of one plausibility query, the at least one variable corresponding to the deviation between the plurality of identically defined comparison variables, and the variable corresponding to the change over time in the difference formed from the variable corresponding to the transverse acceleration acting on the vehicle and the comparison variable for the transverse acceleration is taken into account in determining whether the vehicle is on the road surface inclined across the direction of travel of the vehicle, the variable corresponding to the change over time in the difference formed from the variable corresponding to the transverse acceleration acting on the vehicle and the comparison variable for the transverse acceleration is, implemented as a counter, the counter is incremented when the change over time is greater than a first threshold value, the counter is decremented when the change over time is smaller than a second threshold value, and the counter approaches a predetermined value when the difference formed from the variable corresponding to the transverse acceleration acting on the vehicle and the comparison variable for the transverse acceleration remains almost unchanged over time.

9. The device according to claim 8, wherein the predetermined value is 0.

10. A device for regulating a motion variable representing a vehicle motion of a vehicle, comprising:

a first apparatus for detecting a plurality of variables corresponding to the vehicle motion, each one of i-he plurality of variables corresponding to the vehicle motion being different from another one of the plurality of variables corresponding to the vehicle motion;

a second apparatus for determining a plurality of identically defined comparison variables for at least two elements of the first apparatus on the basis of at least the plurality of variables corresponding to the vehicle motion; and a third apparatus for performing a plurality of plausibility queries at least on the basis of the plurality of identically defined comparison variables in order to perform a determination as to whether the vehicle is located on a road surface inclined transversely to a direction of travel of the vehicle, wherein a result of the determination is taken into account in regulating the motion variable representing the vehicle motion, wherein:

at least one plausibility query is performed in the third apparatus on the basis of the plurality of identically defined comparison variables to determine whether the plurality of identically defined comparison variables is arranged in at least one predetermined arrangement in accordance with values of the plurality of identically defined comparison variables, at least one of a minimum of the at least one predetermined arrangement corresponds to a cornering on the road surface inclined across the direction of travel of the vehicle, at least one variable corresponding to a deviation between the plurality of identically defined comparison variables is determined in the third apparatus on the basis of the plurality of identically defined comparison variables, a variable corresponding to a change over time in a difference formed from a variable detected with the first apparatus corresponding to a transverse acceleration acting on the vehicle and a comparison variable for the transverse acceleration is determined in the third apparatus on the basis of the variable corresponding to the transverse acceleration and the comparison variable, and at least one of a result of a minimum of one plausibility query, the at least one variable corresponding to the deviation between the plurality of identically defined comparison variables, and the variable corresponding to the change over time in the difference formed from the variable corresponding to the transverse acceleration acting on the vehicle and the comparison variable for the transverse acceleration is taken into account in determining whether the vehicle is on the road surface inclined across the direction of travel of the vehicle; and wherein when a status of a counter is greater than a predetermined threshold value, the vehicle is deemed to be located on the road surface inclined across the direction of travel of the vehicle, and the counter is incremented at least as a function of at least one of the following conditions:

the at least one predetermined arrangement of the plurality of identically defined comparison variables is provided, the at least one variable corresponding to the deviation between the plurality of identically defined comparison variables is greater than a first threshold value, and an amount of the variable corresponding to the change over time in the difference formed from the variable corresponding to the transverse acceleration acting on the vehicle and the comparison variable for the transverse acceleration is greater than a second threshold value, and the counter is decremented at least as a function of at least one of the following conditions:

none of the at least one predetermined arrangement of the plurality of identically defined comparison variables is found, the at least one variable corresponding to the deviation between the plurality of identically defined comparison variables is smaller than the first threshold value, and an absolute value of the variable corresponding to the change over time in the difference formed from the variable corresponding to the transverse acceleration acting on the vehicle and the comparison variable for the transverse acceleration is smaller than the second threshold value.

11. The device according to claim 1, wherein:

a variable corresponding to a vehicle speed is determined at least on the basis of a part of the plurality of variables corresponding to the vehicle motion detected with the first apparatus, and the determination as to whether the vehicle is located on a road surface inclined transversely to a direction of travel of the vehicle is performed only when at least one of the following conditions is satisfied:

the variable corresponding to the vehicle speed is greater than a respective threshold value, and an absolute value of a first identically defined comparison variable is greater than an absolute value of a second identically defined comparison variable.

12. A method of regulating a motion variable representing a vehicles motion of a vehicle, comprising the steps of:

detecting a plurality of variables corresponding to the vehicle motion with a first apparatus;

determining a plurality of identically defined comparison variables for at least two elements of the first apparatus on the basis of at least the plurality of variables corresponding to the vehicle motion;

performing a plurality of plausibility queries at least on the basis of the plurality of identically defined comparison variables to determine whether the vehicle is located on a road surface inclined transversely to a direction of travel of the vehicle; and taking into account the determination whether the vehicle is located on a road surface inclined transversely to a direction of travel of the vehicle in regulating the motion variable representing the vehicle motion.

* * * * *

UNITED STATES PATENT AND TRADEMARK OFFICE
CERTIFICATE OF CORRECTION

PATENT NO. : 6,427,130 B1
DATED : July 30, 2002
INVENTOR(S) : Rolf-H Mergenthaler et al.

It is certified that error appears in the above-identified patent and that said Letters Patent is hereby corrected as shown below:

<u>Title page,</u>
Item [57], ABSTRACT,
Line 1, change "if" to -- of --, and change "Variables" to -- variables --

<u>Column 2,</u>
Lines 30 and 39, change "means" to -- apparatus --

<u>Column 15,</u>
Line 59, change "al:" to -- at --

Signed and Sealed this

Thirtieth Day of September, 2003

JAMES E. ROGAN
*Director of the United States Patent and Trademark Office*